May 3, 1955
C. B. LIVERS
2,707,455
SERVO VALVE MECHANISM
Filed Oct. 3, 1952
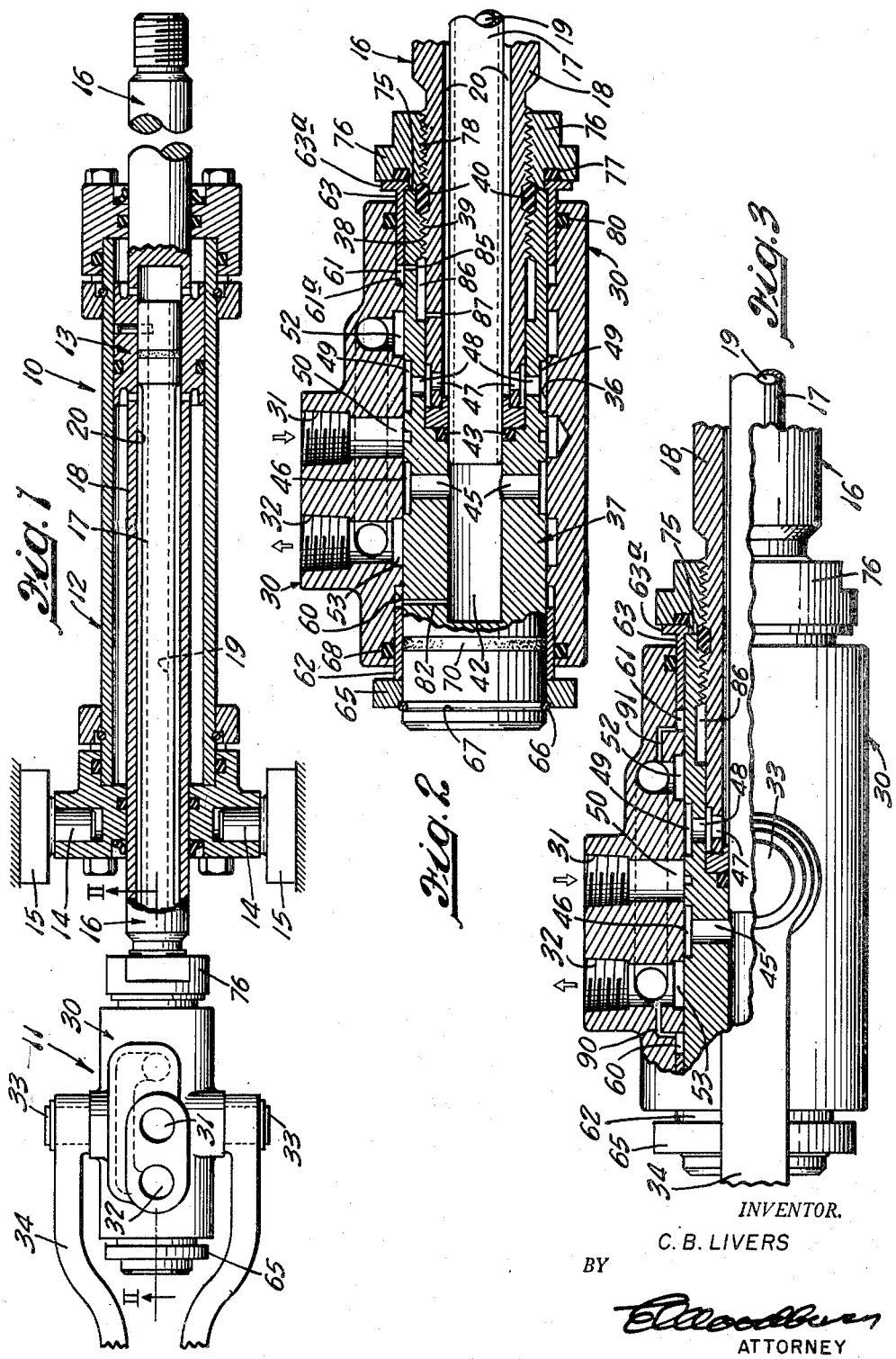
INVENTOR.
C. B. LIVERS
BY
ATTORNEY 2,707,455
Patented May 3, 1955

United States Patent Office

2,707,455
SERVO VALVE MECHANISM

Carlos B. Livers, North Hollywood, Calif., assignor to Bendix Aviation Corporation, North Hollywood, Calif., a corporation of Delaware Application October 3, 1952, Serial No. 313,011

6 Claims. (Cl. 121—41)

This invention relates to valves for hydraulic power assist systems in which manual force applied to move a load device actuates a valve to energize a hydraulic motor and cause it to assist the manual force. Such systems are widely used, for example, in steering mechanisms for vehicles, boats and the like, where it is desired to reduce the manual force required while retaining exact control as to the extent of movement. Actually the valve introduces some lost motion between the manual control element and the steering element but it can be made negligible relative to the total range of movement.

The manual force required in the simplest systems may be only that required to shift the valve if the hydraulic force available is greater than the maximum steering load resistance. However it is often desirable to insert some resistance to the valve movement to prevent hunting and/or impart to the control element a resistance less than but proportional to the steering resistance to give "feel."

Hunting can be controlled by applying to the valve a constant resistance independent of the steering resistance. "Feel" can be imparted by applying the fluid pressure delivered to the motor to a suitable pressure area on the valve. Broadly these methods are known.

An object of the invention is to provide a simple and practical servo valve construction for preventing hunting or providing "feel."

Another object is to provide a servo valve of the closed center type for operation from a constant pressure hydraulic fluid and providing "feel."

Other more specific objects and features of the invention will appear from the description to follow.

In the drawing:

Fig. 1 is a general view partially in side elevation and partially in section showing a servomotor system incorporating a valve in accordance with the invention;

Fig. 2 is a longitudinal sectional view in the plane II—II of Fig. 1 showing the valve construction of the present invention adapted for providing "feel"; and Fig. 3 is a longitudinal sectional view similar to Fig. 2 but showing the valve construction of the present invention adapted for preventing hunting.

Referring to Fig. 1, there is shown a system comprising a motor indicated generally at 10 and a valve indicated generally at 11.

The motor 10 comprises as its essential elements a cylinder 12 and a piston 13. The motor cylinder 12 is shown anchored at its left end as by trunnions 14 to a stationary member 15. A piston rod 16 extends from the piston 13 through both ends of the cylinder 12. The right end of the piston rod 16 is intended to be coupled to the load to be actuated. The left end of the piston rod 16 is mechanically connected to the valve 11 so that the latter moves with it. The left end portion of the piston rod 16 also effects hydraulic connection between the valve 11 and the motor 10. Thus it will be observed that the left end portion of the piston rod 16 comprises inner and outer tubular members 17 and 18 in spaced relation. The inner hollow member 17 defines one motor passage 19 which connects the valve 11 with the right end of the motor cylinder 12. The annular space 20 between the inner and outer tubular members 17 and 18 defines a second motor passage communicating the left end of the cylinder 12 with the valve 11. Since the present invention resides in the construction of the valve 11 and not in the construction of the motor 10, a further detailed description of the motor is unnecessary.

The valve 11 comprises an outer cylinder element 30, sometimes referred to herein as a manual element, which has pressure and exhaust ports 31 and 32 respectively adapted to be connected by flexible hose lines to a source of hydraulic pressure and a return line. The cylinder element 30 is also provided with trunnions 33 whereby it may be connected to a yoke 34 which in turn is actuated manually in one direction or the other to control the operation of the motor 10.

Referring to Fig. 2, the valve cylinder element 30 defines a cylinder 36 which engages in sealing relation a valve piston element 37, sometimes referred to herein as a motor element, which is secured to the left end of the piston rod 16. Thus the piston element 37 is hollow and open at the right end and has internal threads 38 which are engaged by external threads 39 on the outer tubular member 18 of the piston rod. An annular seal 40 effects a fluid seal between the piston and the outer tubular member 16. The inner tubular member 17 of the piston rod extends beyond the outer tubular member 18 into a recess 42 in the piston 37 and is sealed with respect thereto by an annular sealing ring 43. The inner piston rod passage 19 is communicated through the recess 42 and a pair of lateral passages 45 with an annular motor port 46 in the surface of the piston 37. The other motor passage 20, defined by the two tubular members 17 and 18 of the piston rod, is communicated by passages 47 in the tubular member 18 and passages 48 in the piston 37 with a second annular motor port 49 in the surface of the piston 37.

The cylinder element 30 defines a pressure port 50, connected to the pressure port 31, which opens into the cylinder surface 36 midway between the piston ports 46 and 49 when the valve is in centered position. The valve cylinder 36 is also provided with a pair of exhaust ports 52 and 53 respectively, which are connected to the return or exhaust port 32.

It will be observed from Figs. 1 and 2 that if manual force is applied to the yoke 34 to shift the valve cylinder (manual) element 30 to the right, the resultant relative movement between the valve cylinder element 30 and the valve piston element 37 connects the cylinder pressure port 50 to the piston motor port 49, thereby applying pressure fluid through passages 48 and 47 and the piston rod passage 20 to the left end of the motor cylinder 12, thereby urging the motor piston 13 to the right. The same movement of the motor cylinder element 30 connects the return port 53 through the piston port 46, the passage 45 and the passage 42 with the piston rod passage 19 and thence to the right end of the motor cylinder, so that the motor piston, the piston rod, and the valve piston are all urged to the right by the hydraulic pressure.

During this movement the operator causes the valve cylinder element 30 to follow the valve piston element by maintaining a following force on it through the yoke 34.

If the operator desires to stop the movement he stops applying pressure to the yoke 34 whereupon the valve cylinder element stops and the continuing movement of the valve piston element restores it to the central position with respect to the cylinder element, as shown in Fig. 2, in which both of the motor ports 46 and 49 in the piston element are isolated from both the pressure port 31 and the return port 32, thereby locking the motor in the position into which it has been moved.

If it is desired to move the motor piston rod 16 to the left, the yoke 34 is moved manually to the left. This moves the valve cylinder 30 to the left causing the pressure port 50 to register with the piston motor port 46 and causing the valve cylinder return port 52 to register with the valve piston motor port 49, thereby delivering fluid to the right end of the motor cylinder 12 and exhausting it from the left end.

A defect of a simple servo system, such as has been described so far, is that there is nothing to restrain relative movement between the valve piston element 37 and the valve cylinder element 30, so that any slight disturbance can cause these elements to shift from center or neutral position into an end position in which pressure fluid is supplied to the motor.

When the valve cylinder element 30 is stationary, any movement of the motor piston 13 moves the valve piston element 37 in such direction as to admit fluid to the motor in such wise as to move it hydraulically in the opposite direction, thereby causing oscillation, which is commonly referred to as hunting.

Another defect of a simple system as so far described is that since there is no reaction between the valve piston 37 and the valve cylinder 30, only a slight constant force on the yoke 34 is sufficient to maintain flow of hydraulic fluid to the motor regardless of the resistance to movement of the piston rod 16 imparted by the load connected thereto and the high hydraulic pressure that may be necessary to overcome this resistance. It is often desirable to provide a hydraulic reaction force on the valve 30 to indicate to the operator the extent of the force that is being developed by the motor and applied to the load.

There is shown in Fig. 2 a simple arrangement in accordance with the present invention for imparting a reaction to the valve cylinder element 30 proportional to the hydraulic pressure that is applied to the motor and giving a measure of resistance to movement or as it is commonly termed "feel."

In Fig. 2 the structure for imparting feel comprises an annular recess 60 at the left end of the valve cylinder 36 and an annular recess 61 at the right end. These recesses are formed by counterbores extending inwardly from the opposite ends of the cylinder element to the valve cylinder 36 which contains the fluid-controlling flow ports. Cooperating with the recess 60 in the valve cylinder element, is a piston land 62, and cooperating with the valve cylinder recess 61 is a piston land 63. To simplify construction of the valve, these lands 62 and 63 are constituted by separate sleeves which are fitted to the valve piston surface. The sleeve 62 is a plain sleeve and is limited against outward movement with respect to the piston element 37 by a collar 65 which is fitted on the left projecting end of the piston 37 and retained by a split ring 66 in a groove 67 in the piston. Leakage of fluid between the sleeve 62 and the annular wall of the recess 60 is prevented by a sealing ring 68 in a groove provided therefor in the wall of the recess 60. Leakage of fluid between the sleeve 62 and the piston 37 is prevented by providing a sealing ring 70 in a groove in the surface of the piston 37.

The right sleeve 63 is prevented from movement with respect to the piston 37 by a flange 63a on the outer end thereof, the inner edge of this flange bearing against the end edge 75 of the piston 37, and the outer end face of the flange 63a being engaged by a lock nut 76 which has internal threads engaging a set of threads 78 on the piston rod member 18 located exterior of the sealing ring 40. A sealing ring 77 in an annular groove in the inner end face of the lock nut 76 prevents leakage therepast. The sealing ring 40 prevents any leakage past the threads 39 or 78 from the inner surface of the sleeve 63. The valve cylinder element contains an annular sealing element 80 sealing with the outer surface of the sleeve 63 to prevent leakage therepast.

The recess 60 is communicated by a passage 82 with the passage 42 and thence with the passage 19 which communicates with the right end of the motor cylinder 12. The recess 61 is communicated by passages 85, 86 and 87 with the annular passage 20 between the piston rod members 18 and 17, which communicates with the left end of the motor cylinder 12.

It will be observed that movement of the valve cylinder element 30 to the right applies pressure fluid from the pressure port 50 to the piston port 49 and through the piston rod passage 20 to the left end of the motor 12 to urge the piston and the piston rod to the right. This same pressure is applied through the passages 87, 86 and 85 to the recess 61 developing a pressure therein which is applied to the pressure face 61a constituted by the left end of the annular recess 61. Pressure on this face acts to urge the valve cylinder element 30 to the left in direction opposite to that in which it is being manually moved. At the same time, the recess 60 at the left end of the valve is connected through the passage 82, the passage 42, the passage 45, and the piston port 46 to the return port 32, so that there is no pressure in the recess 60 opposing the force created by the pressure in the other recess 61. The resultant pressure force opposing the manual force is proportional to the pressure in the motor cylinder, which in turn is proportional to the reactive force of the load that is being moved by the motor. Hence the reactive force on the valve cylinder gives the operator a feel as to magnitude of the force that has to be overcome. It will be apparent that when the manual force applied to the yoke 34 is in direction to move it to the left, the condition is reversed, in that pressure fluid is then applied to the recess 60 and the recess 61 is connected to the return port.

There are certain situations where it is considered not necessary or desirable to provide for "feel" in a system of this type but in which it is desired to introduce some resistance to relative movement between the valve cylinder and the valve piston to prevent hunting. This result can be readily achieved in accordance with the present invention by simply eliminating the passages 82 and 85 of Fig. 2 and substituting passages 90 and 91 as shown in Fig. 3. These passages 90 and 91 are restricted and simply connect the recesses 60 and 61 respectively with the return passage in the valve cylinder. With this arrangement no pressure is applied to the recesses 60 and 61, but whenever the valve cylinder is moved in either direction with respect to the valve piston, one of the recesses is expanded and the other is contracted. In order for either recess to contract, the fluid therein must be exhausted and by making the passages 90 and 91 of restricted dimensions any desired resistance to movement can be obtained.

Although for the purpose of explaining the invention, a particular embodiment thereof has been shown and described obvious modifications will occur to a person skilled in the art, and I do not desire to be limited to the exact details shown and described.

I claim:

1. A valve for use in a servomotor assembly in which a motor element of the valve is mechanically connected to the motor for follow-up movement therewith and a manual element is manually movable relative to and cooperates with the motor element to direct pressure fluid to one of two motor passages in the valve to the motor in such wise as to urge the motor and said motor element of the valve to move with the manual element thereof, said valve comprising: cooperating cylinder and piston elements relatively reciprocable through a limited range and having main sections of uniform fitted diameter; one of said elements constituting said motor element and having a pair of motor passages, and the other element constituting said manual element and having pressure and exhaust passages therein; cooperating ports in said main sections of said elements responsive to movement of the other of said elements in either direction out of central position relative to the one element for connecting said pressure and exhaust passages of the other element to the respective motor passages in the one element; said other element having annular recesses at opposite ends of its main section, the inner end of each recess constituting a pressure face; lands on said one element fitting said recesses in said other element and sealing therewith and having their inner ends spaced from said pressure faces to define therewith annular pressure chambers oppositely expansible and contractable in response to relative reciprocation between said elements; and passage means for conducting fluid to and from said chambers to control relative reciprocation between said elements.

2. A valve according to claim 1 in which said passage means is in said other valve element and defines a restricted passage between each pressure chamber and said exhaust passage.

3. A valve according to claim 1 in which said passage means is in said one member and defines a separate passage from each of said pressure chambers to one of said respective motor passages such that movement of said other element out of central position with respect to said one element contracts that pressure chamber connected to the motor passage to which pressure is applied by said movement.

4. A valve according to claim 1 in which said piston element is said one element and comprises an inner integral piston and one at least of said lands comprises a sleeve fitting on said piston, means sealing said sleeve with said inner piston against fluid leakage therebetween and means limiting outward movement of said sleeve on said piston.

5. A valve according to claim 1 in which said piston element constitutes said one valve element and comprises: a hollow member having an open internally threaded end; a piston rod extending into said hollow member and having a first set of external threads engaging said internal threads and a second set of external threads longitudinally outwardly spaced from said first set of threads by an annular groove and compressible sealing means in said groove; one of said lands comprising a sleeve on said one end of said piston having a radial inwardly extending flange at its outer end engaging the end of said piston; a lock nut engaging said second set of threads and having an outer annular end face engaging the outer end of said sleeve and an inner annular end face projecting longitudinally beyond said outer face into engagement with said piston; and annular sealing means between the outer end of said sleeve and said lock nut.

6. A valve according to claim 1 in which said piston element constitutes said one valve element and comprises: a hollow member having an open internally threaded end; a piston rod extending into said hollow member and having a first set of external threads engaging said internal threads and a second set of external threads longitudinally outwardly spaced from said first set of threads by an annular groove, and compressible sealing means in said groove; one of said lands comprising a sleeve on said one end of said piston; stop means on said piston engageable with said sleeve for limiting outward movement of said sleeve with respect to said piston elements; and annular sealing means on said piston engaging the inner face of said sleeve for preventing longitudinal leakage therebetween.

References Cited in the file of this patent

UNITED STATES PATENTS

| | | |
|---|---|---|
| 1,258,337 | Imblum | Mar. 5, 1918 |
| 2,488,173 | Churn | Nov. 15, 1949 |
| 2,560,813 | Nelson | July 17, 1951 |